Oct. 7, 1947.  J. GREGG  2,428,664
APPARATUS FOR MOLDING SOLES FOR FOOTWEAR
Filed Jan. 19, 1944  3 Sheets-Sheet 1
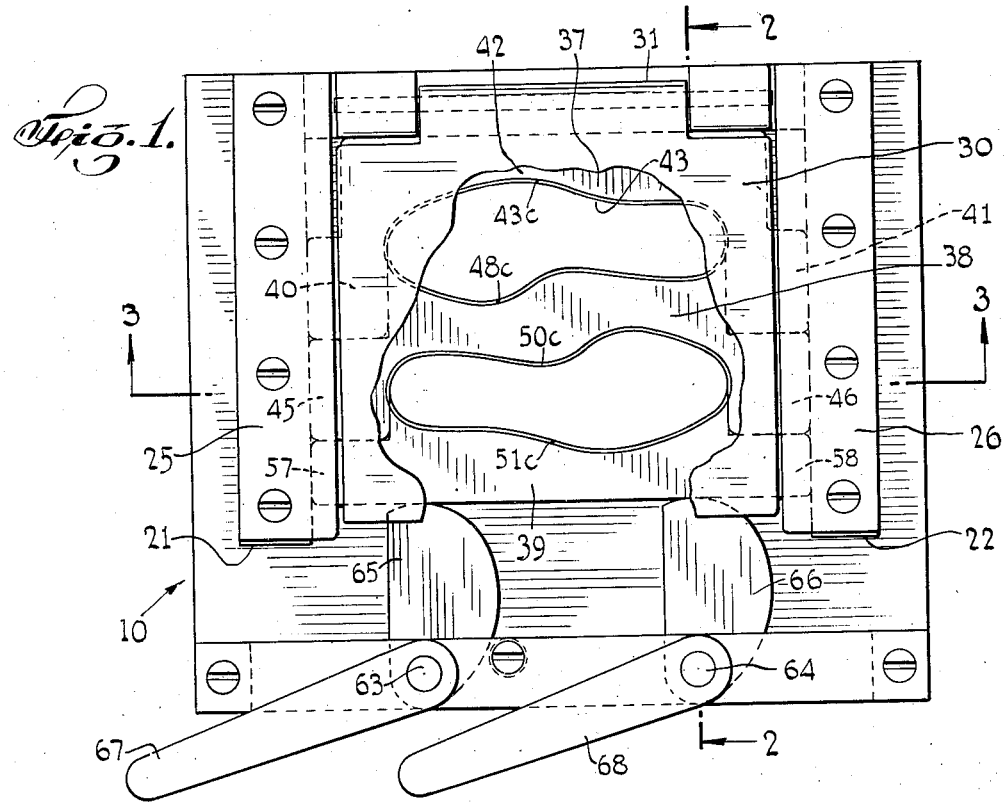
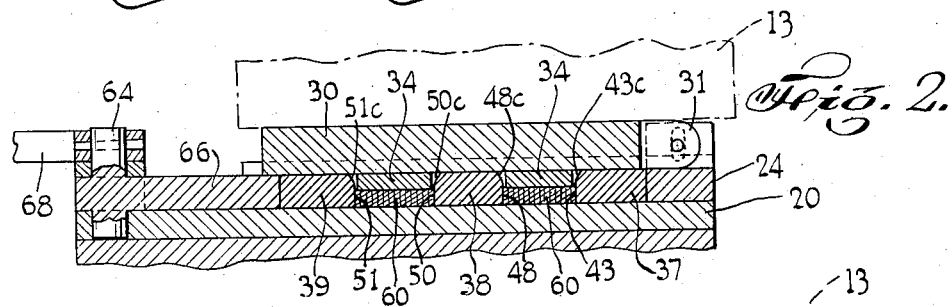
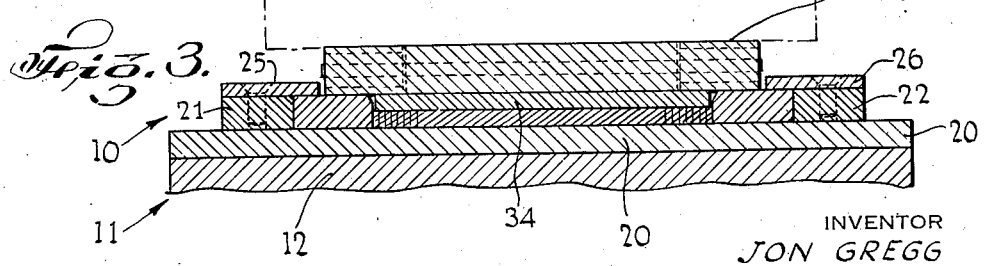
INVENTOR
JON GREGG
BY
J. B. Felshin
ATTORNEY Oct. 7, 1947.  J. GREGG  2,428,664
APPARATUS FOR MOLDING SOLES FOR FOOTWEAR
Filed Jan. 19, 1944   3 Sheets-Sheet 2

INVENTOR
JON GREGG
BY
J. B. Felshin
ATTORNEY

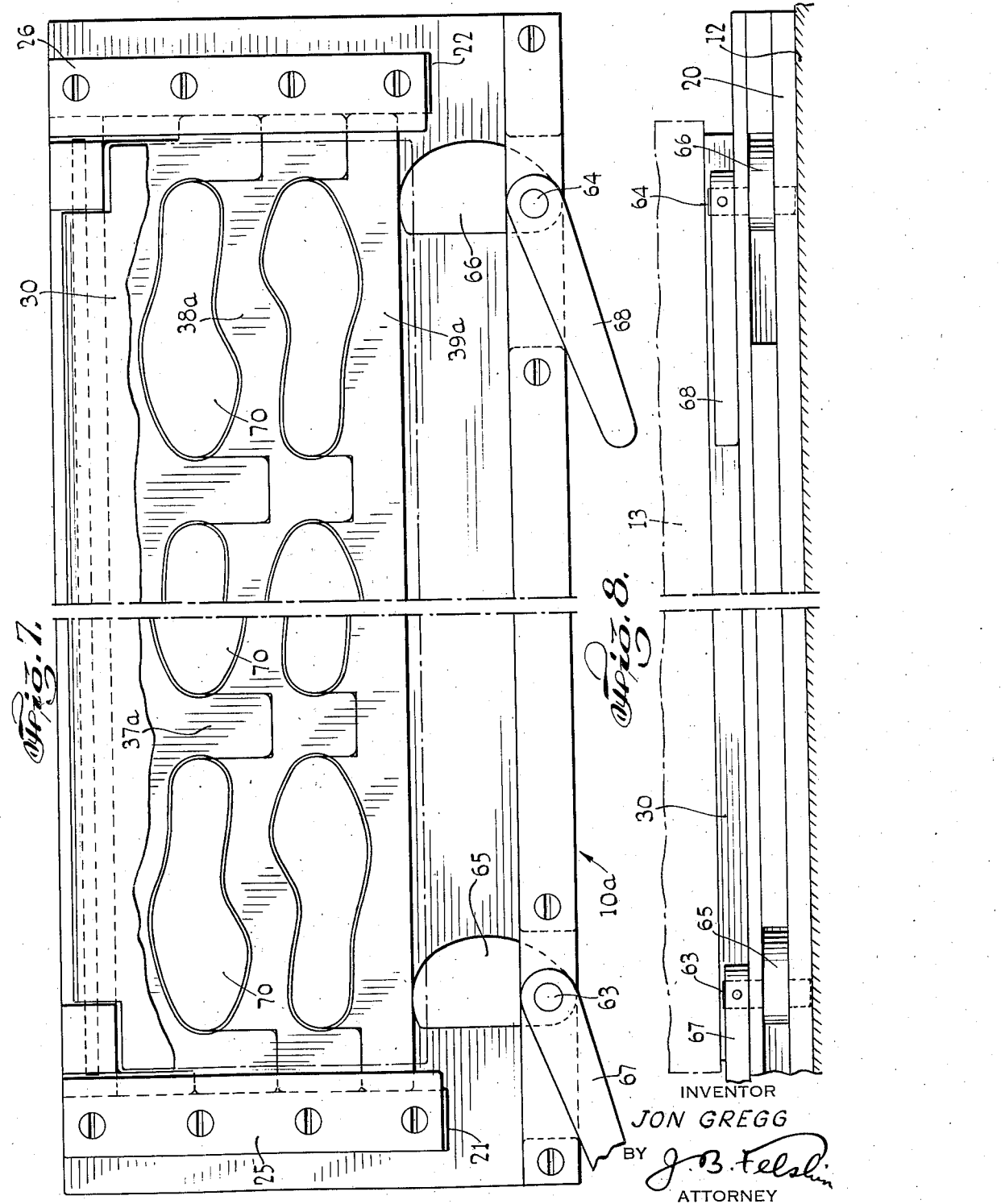

Patented Oct. 7, 1947

2,428,664

UNITED STATES PATENT OFFICE 2,428,664

APPARATUS FOR MOLDING SOLES FOR FOOTWEAR

Jon Gregg, Newhope, Pa., assignor to Lynne D. Gregg, Newhope, Pa.

Application January 19, 1944, Serial No. 518,789

8 Claims. (Cl. 18—42)

This invention relates to apparatus for molding soles for footwear.

An object of this invention is to provide a mold of the character described having means to apply vertical as well as lateral pressure to the soles during the molding operation.

Another object of this invention is to provide a mold adapted to mold a plurality of soles at the same time, and in which the molds are split and comprise relatively slidable parts to facilitate molding the soles.

Yet a further object of this invention is to provide a mold comprising a bottom plate, and split mold sections, and a top plate, the mold sections being adapted to be pressed together to produce lateral pressure, and the top having means to press down against the soles in the molds to produce vertical pressure thereon.

Yet a further object of this invention is to provide a compact and durable mold of the character described which shall be relatively inexpensive to manufacture, easy to manipulate, and which shall yet be practical and efficient to a high degree in use.

Still another object of this invention is to provide a mold of the character described in which mold members of different patterns may be inserted into the same frame so that the patterns are interchangeable for size, style or for men's or women's soles.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is a top plan view of a mold embodying the invention;

Fig. 2 is a cross-sectional view taken on line 2—2 of Fig. 1;

Fig. 3 is a cross-sectional view taken on line 3—3 of Fig. 1 and showing the mold in a press;

Fig. 7 is a top plan view of a mold embodying the invention and illustrating a modified construction; and Fig. 8 is a front edge view of the mold shown in Fig. 7.

Figure 4:
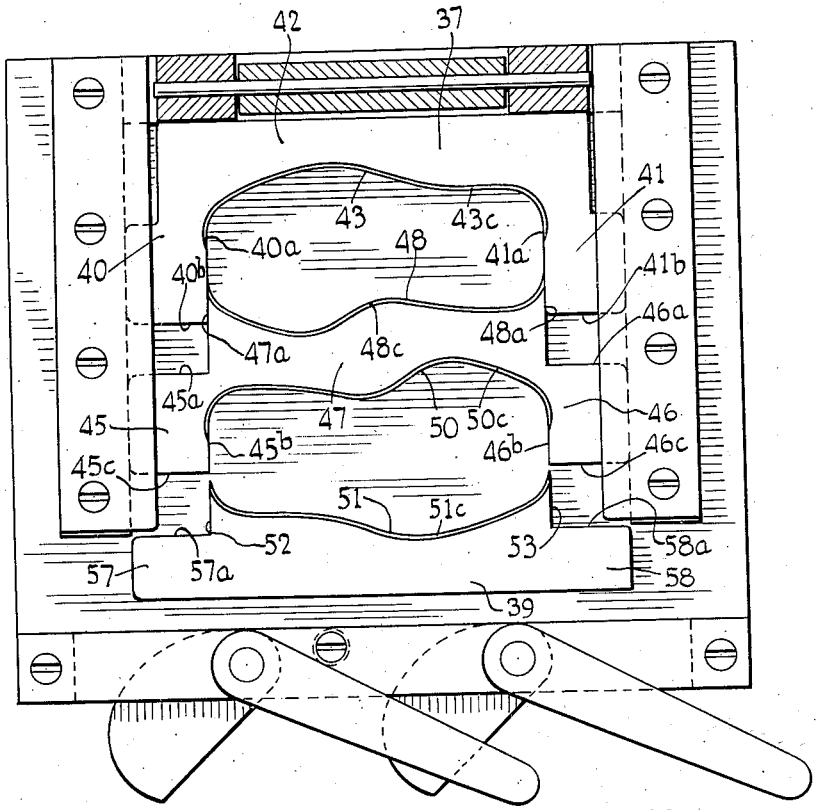
Fig. 4 is a view similar to Fig. 1 but showing the mold opened up.

Referring now in detail to the drawing, 10 designates a mold embodying the invention and adapted to be placed on a press 11 comprising a platen 12 and a ram 13, the press being provided with the usual heating means whereby to mold under heat and pressure as will appear hereinafter.

The mold 10 comprises a bottom plate 20 to the sides of which are attached strips 21 and 22 forming side walls. At the rear of the plate 20 and on the upper side thereof is attached a strip 24 forming a rear wall. Attached to the side walls 21 and 22 are parallel narrow plates 25 and 26 extending inwardly beyond the side walls and forming guides for mold members as will appear hereinafter. The guide plates 25 and 26 extend to the rear of the mold and terminate short of the front end of the mold for the purpose hereinafter appearing.

Hinged to the rear wall 24 is a top plate 30. The top plate 30 is hinged to the rear wall 24 by means of a sliding hinge 31 to permit plate 30 to have vertical up and down movement.

Attached to the underside of plate 30 are a plurality of sole shaped plungers or inserts 34 for the purpose hereinafter appearing. Slidably mounted on bottom plate 20 and between the side walls 21 and 22 and retained on the plate 20 by the guide plates 25 and 26, are a plurality of mold members 37, 38 and 39. Mold member 37 has parallel side portions 40 and 41 and a rear interconnecting portion 42. Portion 42 has a cutout edge 43 having the shape of one longitudinal side of a sole. In other words, the edge 43 is shaped similar to the edge of the sole located at one side of a longitudinal axis of the sole. The portions 40 and 41 of mold member 37 have inner parallel edges 40a and 41a.

Mold member 38 comprises parallel side portions 45 and 46 interconnected by a portion 47. Portion 47 has an edge 48 complementary to edge 43 and similar to the edge of the sole on the opposite side of said longitudinal axis. Edges 43 and 48 together have the shape or contour of a complete outsole. Portion 47 also has parallel edges 47a and 48a adapted to slidably engage within the guide edges 40a and 41a. Portions 45 and 46 have rear edges 45a and 46a adapted to contact the forward edges 40b and 41b of portions 40 and 41 of mold 37 when the sole is fully compressed laterally for the molding operation.

Interconnecting portion 47 of mold 38 also has a mold edge 50 between the side portions 45 and 46 having the shape of the edge of one longitudinal half of a sole. Portions 45 and 46 have inner parallel edges 45b and 46b similar to the inner parallel edges 40a and 41a of mold 37.

Mold portion 39 has an edge 51 complementary to edge 50 and having the shape of the other half of the sole of which edge 50 is one-half.

Mold portion 39 also has parallel edges 52 and 53 adapted to slidably engage the parallel edges 45b and 46b. At the sides of mold member 39 are wings 57 and 58 having rear edges 57a and 58a adapted to substantially contact the forward edges 45c and 46c of the side portions 45 and 46 of mold member 38.

The side portions 40, 41, 45, 46, 57, 58 of the mold members 37, 38 and 39 respectively, are adapted to engage beneath the guide plates 25 and 26 so as to be held down on the mold. The mold members however, may be slidably moved forwardly. The side portions thereof clear the forward edges of the guide plates 25, 26 to permit the mold members to be lifted off the plate 20. The mold members 37, 38 and 39 are preferably of greater thickness than the sole 60 to be molded. Thus if the sole is to be ½" in thickness when finished, the mold members 37, 38 and 39 are ¾" or 1" in thickness.

It will be noted that as shown in Fig. 2 of the drawing that projections or inserts 34 are adapted to fit into the mold openings when the mold members are compressed. Thus if the sole is to be ½" thick and the mold members are ¾" thick, the inserts 34 are to be ¼" in thickness so that as the inserts enter the mold openings they will compress the soles.

The upper portions of the edges 43, 48, 50 and 51 are beveled or inclined outwardly and upwardly as at 43c, 48c, 50c and 51c. The beveled or inclined edges serve to guide the inserts downwardly into the mold openings.

Figure 5:
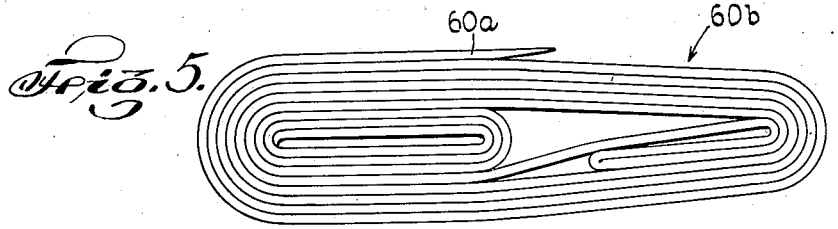
Fig. 5 is a top plan view of a wound strip to which has been attached uncured rubber and which has been wound into the general shape of a sole before putting in a mold.
Figure 6:
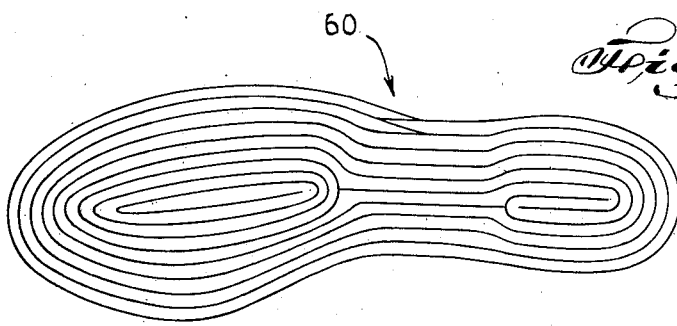
Fig. 6 is a top plan view of the molded sole.

The soles 60 may be prepared as described in my co-pending application, Serial No. 401,179, filed July 5, 1941, now Patent No. 2,361,938. As disclosed in said co-pending application there is pressed against one side of a strip of flattened braid, a strip of uncured rubber or plastic material in tacky condition. The stuck together strips 60a are then wound into the general shape of a sole shown at 60b in Fig. 5. Members 60b are then placed into the mold openings.

Means is provided to press the mold members together to exert lateral pressure on the soles. To this end there is pivoted to the front end of plate 20 as at 63 and 64 a pair of cams 65 and 66. The cams are provided with handles 67 and 68 for rotating said cams. Upon rotating the cams in one direction the cams engage mold member 39 to press the mold members rearwardly for closing up the mold openings. Upon rotating the handles in opposite directions the mold members are released. The cams may be such as to retain the mold members in sole compressing position when moved to such position.

It will now be understood that the wound members 60b are placed in the mold openings of the mold members and are then compressed. The top plate 30 is then swung down so that the inserts 34 will enter the mold openings. The mold is then placed on the platen 12. The ram 13 then comes down against the top plate 30 to compress the molds vertically and members 60b are then molded by heat as well as by lateral and vertical pressure to produce the molded soles 60.

Although the mold is shown in the drawing as comprising only two mold openings it will be understood that instead of using only one mold member 38 any suitable number of similar members 38, may be interposed between the mold members 37 and 39.

Furthermore each of the mold members may have a plurality of mold edges so that the mold openings will be in horizontal as well as parallel rows. Such a mold is shown at 10a in Figs. 7 and 8. Mold 10a is similar to mold 10 except that the mold openings 70 are multiplied in each row. The cams 65, 66 are more spaced apart. The mold members 37a, 38a, 39a each have end wings and a plurality of mold edges as shown in the drawing.

Although the mold is shown herein as being used for molding soles it will be understood that the molds may also be used to mold other flat articles, it merely being necessary to change the contour of the mold openings to produce the articles desired to be molded.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described by invention, I claim as new and desire to secure by Letters Patent:

1. A mold comprising a member having a bottom wall, side walls and parallel top guides at the upper ends of the side walls and extending inwardly thereof, a plurality of complementary split mold members slidably mounted on the bottom wall and between the side walls and the ends of the mold members engaging beneath said guides and adapted to form mold openings, means to press said mold members together, and a top plate pivoted to the rear of said first member and having projecting portions adapted to be inserted within the mold openings formed by said mold members.

2. A mold comprising a member having a bottom wall, side walls and parallel top guides at the upper ends of the side walls and extending inwardly thereof, a plurality of complementary split mold members on the bottom wall and between the side walls and beneath said guides and adapted to form mold openings, means to press said mold members together, and a top plate pivoted to the rear of said first member and having projecting portions adapted to be inserted within the mold openings formed by said mold members, said side guides terminating short of the front end of the bottom wall whereby when the mold members are released they may be slidably moved forward beyond the front ends of said side guides and lifted off the bottom wall.

3. A mold comprising a member having a bottom plate, side walls on the bottom plate, top guide flanges on said side walls, a rear wall on said bottom plate, a plurality of mold members on the bottom plate and between the side walls thereof and in front of said rear wall, said guide flanges being adapted to engage the ends of said mold members, adjacent mold members having means to slidably engage each other for relative rearward and forward movement, each pair of adjacent mold members having complementary mold edges together forming a mold opening.

4. A mold comprising a member having a bottom plate, side walls on the bottom plate, top guide flanges on said side walls, a rear wall on said bottom plate, a plurality of mold members on the bottom plate and between the side walls thereof and in front of said rear wall, said guide flanges being adapted to engage the ends of said mold members, adjacent mold members having means to slidably engage each other for relative rearward and forward movement, each pair of adjacent mold members having complementary mold edges together forming a mold opening, the upper portions of said edges being beveled outwardly, and a plate hinged to the rear wall and provided with inserts adapted to enter the mold openings.

5. A mold comprising a member having a bottom plate, side walls on the bottom plate, top guide flanges on said side walls, a rear wall on said bottom plate, a plurality of mold members on the bottom plate and between the side walls thereof and in front of said rear wall, said guide flanges being adapted to engage the ends of said mold members, adjacent mold members having means to slidably engage each other for relative rearward and forward movement, each pair of adjacent mold members having complementary edges together forming a mold opening, the upper portions of said edges being beveled outwardly, a plate hinged to the rear wall and provided with inserts adapted to enter the mold openings, and cam means at the front of the bottom plate adapted to bring said mold members to a position in which they define sole molding cavities.

6. A mold comprising a member having a bottom wall, side walls and parallel top guides at the upper ends of the side walls and extending inwardly thereof, a plurality of complementary split mold members slidably mounted on the bottom wall and between the side walls and the ends of said mold members engaging beneath said guides and adapted to form mold openings, means to press said mold members together, and a top plate pivoted to said first member, and having projecting portions adapted to be inserted within the mold openings formed by said mold members, said guides terminating short of one end of said bottom wall, and said mold members being movable to positions where the ends thereof clear said guides to permit removal of said mold members from said first member.

7. A mold comprising a member having a bottom plate, side walls on the bottom plate, top guide flanges on said side walls, a rear wall on said bottom plate, a plurality of pairs of mold members on the bottom plate and between the side walls thereof and in front of said rear wall, said guide flanges being positioned to engage the ends of said mold members, adjacent mold members having means to slidably engage each other for relative rearward and forward movement, each pair of adjacent mold members having complementary mold edges together forming a mold opening having curved end portions, one of each pair of adjacent mold members having a pair of inner parallel edges extending from the mold edge thereof, and substantially tangent to the ends of the mold opening formed by said pair of mold members, and the other member of said pair of adjacent mold members having a pair of outer parallel edges extending from the mold edge thereof and substantially tangent to the ends of said mold opening and slidably engaging said pair of inner parallel edges.

8. A mold comprising a member having a bottom plate, side walls on the bottom plate, top guide flanges on said side walls, a rear wall on said bottom plate, a plurality of pairs of mold members on the bottom plate and between the side walls thereof and in front of said rear wall, said guide flanges being positioned to engage the ends of said mold members, adjacent mold members having means to slidably engage each other for relative rearward and forward movement, each pair of adjacent mold members having complementary mold edges together forming a mold opening, one of said pair of mold members having a pair of inner parallel edges extending from the mold edge thereof, and tangent said inner edges being to the mold opening formed by said one pair of mold members, and an adjacent mold member having a pair of outer parallel edges extending from the mold edge thereof and tangent to said mold opening and slidably engaging said pair of inner parallel edges, and a top plate having inserts adapted to enter the mold openings.

JON GREGG.

REFERENCES CITED

The following references are of record in the file of this patent:

UNITED STATES PATENTS

| Number | Name | Date |
| --- | --- | --- |
| 1,183,265 | Zabala | May 16, 1916 |
| 1,620,388 | Palmer | Mar. 8, 1927 |
| 1,708,178 | Hottel | Apr. 9, 1929 |
| 962,697 | Clark | June 28, 1910 |
| 1,243,714 | Craig | Oct. 23, 1917 |
| 844,237 | Besser | Feb. 12, 1907 |
| 275,216 | Hyatt | Apr. 3, 1883 |
| 1,775,812 | Church | Sept. 16, 1930 |
| 2,001,305 | Gorham et al. | May 14, 1935 |
| 2,203,543 | Pancorbo | June 4, 1940 |
| 1,964,911 | Haas | July 3, 1934 |

OTHER REFERENCES

Delmonte, Plastics in Engineering, Penton Publishing Company, Cleveland, 1939, pp. 360, 369, 371.